(No Model.)

J. W. STOREY.
PORTABLE SCALE.

No. 502,786. Patented Aug. 8, 1893.

WITNESSES:

INVENTOR
Julius W. Storey
BY
W. S. Boyd,
ATTORNEY.

UNITED STATES PATENT OFFICE.

JULIUS W. STOREY, OF DALLAS, TEXAS.

PORTABLE SCALE.

SPECIFICATION forming part of Letters Patent No. 502,786, dated August 8, 1893.

Application filed September 3, 1892. Serial No. 444,981. (No model.)

*To all whom it may concern:*

Be it known that I, JULIUS W. STOREY, a citizen of the United States, residing at Dallas, in the county of Dallas and State of Texas, have invented certain new and useful Improvements in Portable Scales; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain improvements in portable weighing scales such as are used for weighing cotton, corn and other produce in the field, and its object is to provide a weighing scale of this character of a simple, inexpensive and stanch construction, which at the same time admits of being compactly folded up when not in use, or when it is desired to transport it from one part of the field to another.

My invention also contemplates the provision of suitable tally devices for use during the weighing, together with other minor details of construction all as will be hereinafter fully set forth.

In order that my invention may be the better understood, I have illustrated in the accompanying drawings a weighing scale provided with my improvements, in which drawings—

Figure 1:
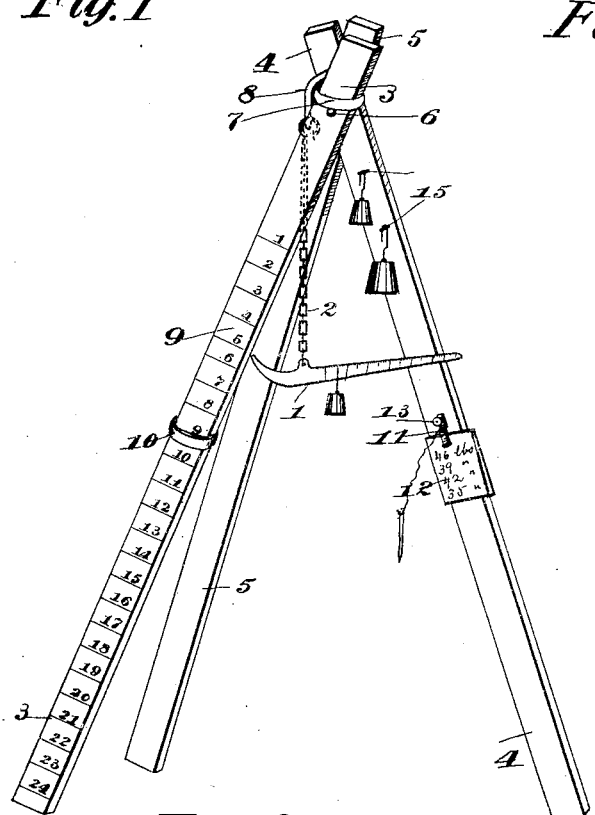
Figure 2:
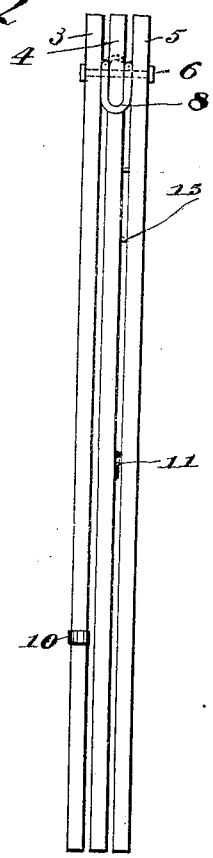
Figure 3:
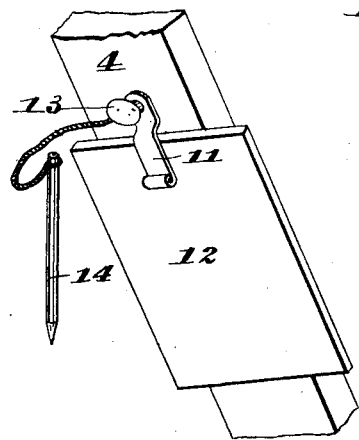
Figure 4:
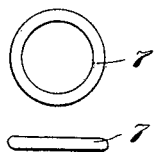
Figure 5:
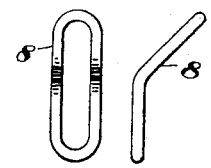
Figure 6:
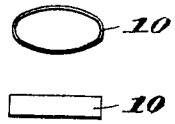

Figure 1 is a view of the device complete, as set up ready for use and Fig. 2 is a view representing it folded and in condition for transportation. Fig. 3 is an enlarged view of a portion of one of the legs of the tripod of my improved scale, illustrating the manner of attaching the memorandum pad or tally sheet thereto. Figs. 4, 5, and 6 are detail views of parts of the device, detached and enlarged, which will be hereinafter referred to.

My improved portable scale consists, as will be seen by reference to the drawings, of an ordinary steelyard 1, suspended by means of a chain 2, from the apex of a tripod comprising legs 3, 4 and 5, respectively, which legs are united near their upper ends by means of a tie-bolt 6, passing through them and headed at each side of the tripod, as clearly seen in Fig. 2. An annulus 7, which may be simply an iron ring or a short chain with its ends united, encircles the three legs at their upper ends above said bolt, whereby when the tripod is set up ready for use, said legs will be held firmly against spreading, whereby the tripod will be held erect when set up for use. The chain 2, is preferably provided with a hook on its free end which engages a bent link 8, arranged over the upper end of the central leg 4 of the tripod, whereby the chain may be readily detached and the steelyard removed from the tripod when the latter is to be folded. This link 8 may be of any suitable construction but is preferably formed of a single oblong link bent near its middle so as to form a depending eye on the under side of the leg 4 for the reception of the hook on chain 2. The form of this bent link 8 will be readily seen by inspection of Fig. 5.

On one of the outer legs, 3, of the tripod is provided, as more clearly seen in Fig. 1, a series of graduations 9, ranging as seen in the figure from 1 to 24, the number of graduations being entirely optional and in no way arbitrary, and over the leg 3, is slipped a band 10, preferably of steel or other elastic material, whereby when said band is thus slipped over said leg it will be held firmly in position by its own elasticity, at the same time admitting of being readily moved up and down on the tripod leg at the will of the operator. I prefer to form this band 10 of an elliptical form, as more clearly seen in Fig. 6, whereby when forced over a square or rectangular leg it will adhere tightly thereto owing to its elasticity. By means of this series of graduations 9 and elastic band 10 it is evident that the weigher may keep a tally or check on the number of weighings performed.

On the inner leg 4 of the tripod, is provided a spring clip 11 for holding a memorandum pad 12, (seen in Fig. 3) which clip and pad are mounted at a convenient height above the ground for use by the operator. The clip 11 is preferably secured to the leg of the tripod by means of a screw 13, having an enlarged or spherical head, to which a pencil 14 may be attached by means of a cord, as seen in Fig. 3, so as to be in position for use when needed.

On the memorandum pad 12 is kept a tally of the result of each weighing operation by weight.

Above the tablet or pad 12 on the central leg 4 are set several stout pins 15, whereon may be hung the extra weights of the steelyard when not in use.

As stated, the ring or annulus 7 may be of any form and while I prefer to form it as shown in Fig. 4, of a single metallic ring or band, I may use a short chain or stout cord instead.

My improved portable weighing scale possesses many advantages for use on the field for weighing produce, as it is evident it may be readily set up and folded together for transportation to different parts of the field and being of so simple a construction, it is not liable to become disarranged or broken by rough or careless usage. It is, moreover, of so light and convenient a form that it may be readily carried over the shoulder when folded up.

I do not wish to be understood as limiting myself to the precise construction and arrangement of my invention as herein shown as it is evident that many changes and alterations may be made therein without material departure from the principles of my invention.

Having thus described my invention, I claim—

The portable field weighing apparatus, consisting in the tripod, graduated upon one of its legs with the tally scale 9, provided with the sliding indicator 10, and having the suspensory link for sustaining the weighing scales, and the clip 11 for holding the tally slate, all substantially as shown and described.

In testimony whereof I affix my signature in presence of two witnesses.

JULIUS W. STOREY.

Witnesses:
FRED H. BROWN,
MILLARD STOREY.